United States Patent
Obregon (10) Patent No.: US 9,816,222 B2
(45) Date of Patent: Nov. 14, 2017

(54) METHOD FOR DETECTING UNDERFILLING OF A WASHING MACHINE APPLIANCE

(71) Applicant: General Electric Company, Schenectady, NY (US)

(72) Inventor: Roberto Obregon, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 136 days.

(21) Appl. No.: 14/868,470

(22) Filed: Sep. 29, 2015

(65) Prior Publication Data

US 2017/0089001 A1   Mar. 30, 2017

(51) Int. Cl.
| | |
|---|---|
| *D06F 39/08* | (2006.01) |
| *D06F 35/00* | (2006.01) |
| *D06F 33/02* | (2006.01) |
| *D06F 33/00* | (2006.01) |
| *D06F 39/00* | (2006.01) |

(52) U.S. Cl.
CPC ............ *D06F 39/087* (2013.01); *D06F 33/00* (2013.01); *D06F 33/02* (2013.01); *D06F 35/006* (2013.01); *D06F 39/003* (2013.01); *D06F 2202/085* (2013.01); *D06F 2202/12* (2013.01); *D06F 2204/086* (2013.01)

(58) Field of Classification Search
CPC ...... D06F 39/003; D06F 39/087; D06F 33/00; D06F 33/02; D06F 2202/085; D06F 2202/12; D06F 2204/086; D06F 35/006
See application file for complete search history.

(56) References Cited

U.S. PATENT DOCUMENTS

| | | | |
|---|---|---|---|
| 5,074,003 A | 12/1991 | Manson et al. | |
| 5,161,393 A * | 11/1992 | Payne | D06F 39/003 68/12.04 |
| 5,208,931 A * | 5/1993 | Williams | D06F 39/003 68/12.04 |
| 5,271,116 A * | 12/1993 | Williams | D06F 39/003 68/12.05 |
| 5,669,095 A | 9/1997 | Dausch et al. | |
| 5,669,250 A * | 9/1997 | Dausch | D06F 39/088 68/12.02 |
| 5,768,728 A | 6/1998 | Harwood et al. | |
| 8,627,687 B2 | 1/2014 | Ashrafzadeh et al. | |
| 2008/0120790 A1* | 5/2008 | Ashrafzadeh | D06F 39/003 8/159 |
| 2015/0000047 A1* | 1/2015 | Obregon | D06F 33/02 8/137 |
| 2015/0052688 A1* | 2/2015 | Obregon | D06F 39/003 8/137 |

* cited by examiner

*Primary Examiner* — Joseph L Perrin
(74) *Attorney, Agent, or Firm* — Dority & Manning, P.A.

(57) ABSTRACT

The present subject matter provides a method for detecting underfilling of a washing machine appliance. The method includes rotating an impeller of the washing machine appliance with a motor operating at a reduced power relative to a full power of the motor. The method also includes determining a maximum angular velocity of the impeller when the impeller is rotated at the reduced power and adding liquid to a tub of the washing machine appliance if the maximum angular velocity of the impeller when the impeller is rotated at the reduced power is less than a threshold angular velocity.

20 Claims, 5 Drawing Sheets

METHOD FOR DETECTING UNDERFILLING OF A WASHING MACHINE APPLIANCE

FIELD OF THE INVENTION

The present subject matter relates generally to washing machine appliances and methods for operating washing machine appliances.

BACKGROUND OF THE INVENTION

Washing machine appliances generally include a tub for containing wash fluid, e.g., water, detergent, and/or bleach, during operation of such washing machine appliances. A drum is rotatably mounted within the tub and defines a wash chamber for receipt of articles for washing. During operation of such washing machine appliances, wash fluid is directed into the tub and onto articles within the wash chamber of the drum. The drum can rotate at various speeds to agitate articles within the wash chamber in the wash fluid, to wring wash fluid from articles within the wash chamber, etc.

During operating of certain washing machine appliances, a volume of water is directed into the tub in order to form wash fluid and/or rinse articles within the wash chamber of the drum. The volume of water can vary depending upon a variety of factors. Large loads can require a large volume of water relative to small loads that can require a small volume of water. Likewise, loads containing absorptive fabrics, such as cotton, can require a large volume of water relative to similarly sized loads containing certain synthetic fabrics, such as polyester or nylon.

To operate efficiently, the volume of water directed into the tub preferably corresponds or correlates to a size of a load of articles within the wash chamber of the drum and/or a load type of articles within the wash chamber of the drum. Thus, large volumes of water are preferably directed into the washing machine's tub for large loads or loads of highly absorptive articles in order to properly wash such loads. Conversely, small volumes of water are preferably directed into the washing machine's tub for small loads or loads of poorly absorptive articles in order to properly wash such loads. Directing an improper volume of water into the drum can waste valuable water and/or energy and can also hinder proper cleaning of articles within the wash chamber of the drum. However, accurately determining the size and/or type of a load of articles within the wash chamber of the drum can be difficult.

Accordingly, a method for detecting underfilling of a washing machine appliance would be useful.

BRIEF DESCRIPTION OF THE INVENTION

The present subject matter provides a method for detecting underfilling of a washing machine appliance. The method includes rotating an impeller of the washing machine appliance with a motor operating at a reduced power relative to a full power of the motor. The method also includes determining a maximum angular velocity of the impeller when the impeller is rotated at the reduced power and adding liquid to a tub of the washing machine appliance if the maximum angular velocity of the impeller when the impeller is rotated at the reduced power is less than a threshold angular velocity. Additional aspects and advantages of the invention will be set forth in part in the following description, or may be apparent from the description, or may be learned through practice of the invention.

In a first exemplary embodiment, a method for detecting underfilling of a washing machine appliance is provided. The method includes adding a predetermined volume of liquid to a tub of the washing machine appliance and performing a series of agitations with an impeller of the washing machine appliance. Each agitation of the series of agitations includes rotating the impeller of the washing machine appliance in a first direction with a motor of the washing machine appliance and then rotating the impeller of the washing machine appliance in a second direction with the motor of the washing machine appliance. A power of the motor when the motor rotates the impeller in the second direction is less than the power of the motor when the motor rotates the impeller in the first direction during the series of agitations. The method also includes determining a maximum angular velocity of the impeller when the impeller is rotating in the second direction during each agitation of the series of agitations and adding liquid to the tub of the washing machine appliance if the maximum angular velocity of the impeller when the impeller is rotating in the second direction during the series of agitations is less than a threshold angular velocity.

In a second exemplary embodiment, a method for detecting underfilling of a washing machine appliance is provided. The method includes adding a predetermined volume of liquid to a tub of the washing machine appliance, rotating an impeller of the washing machine appliance in a first direction with a motor of the washing machine appliance and rotating the impeller of the washing machine appliance in a second direction with the motor of the washing machine appliance. A power of the motor at the step of rotating the impeller of the washing machine appliance in the second direction is less than a power of the motor at the step of rotating the impeller of the washing machine appliance in the first direction. The method also includes determining a maximum angular velocity of the impeller during the step of rotating the impeller of the washing machine appliance in the second direction and adding liquid to the tub of the washing machine appliance if the maximum angular velocity of the impeller during the step of rotating the impeller of the washing machine appliance in the second direction is less than a threshold angular velocity.

In a third exemplary embodiment, a method for detecting underfilling of a washing machine appliance is provided. The method includes adding a predetermined volume of liquid to a tub of the washing machine appliance, locking a basket of the washing machine appliance relative to a tub of the washing machine appliance and rotating an impeller of the washing machine appliance with a motor of the washing machine appliance. A power of the motor at the step of rotating the impeller of the washing machine appliance is less than a full power of the motor. The method also includes determining a maximum angular velocity of the impeller during the step of rotating the impeller of the washing machine appliance and adding liquid to the tub of the washing machine appliance if the maximum angular velocity of the impeller during the step of rotating the impeller of the washing machine appliance is less than a threshold angular velocity.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
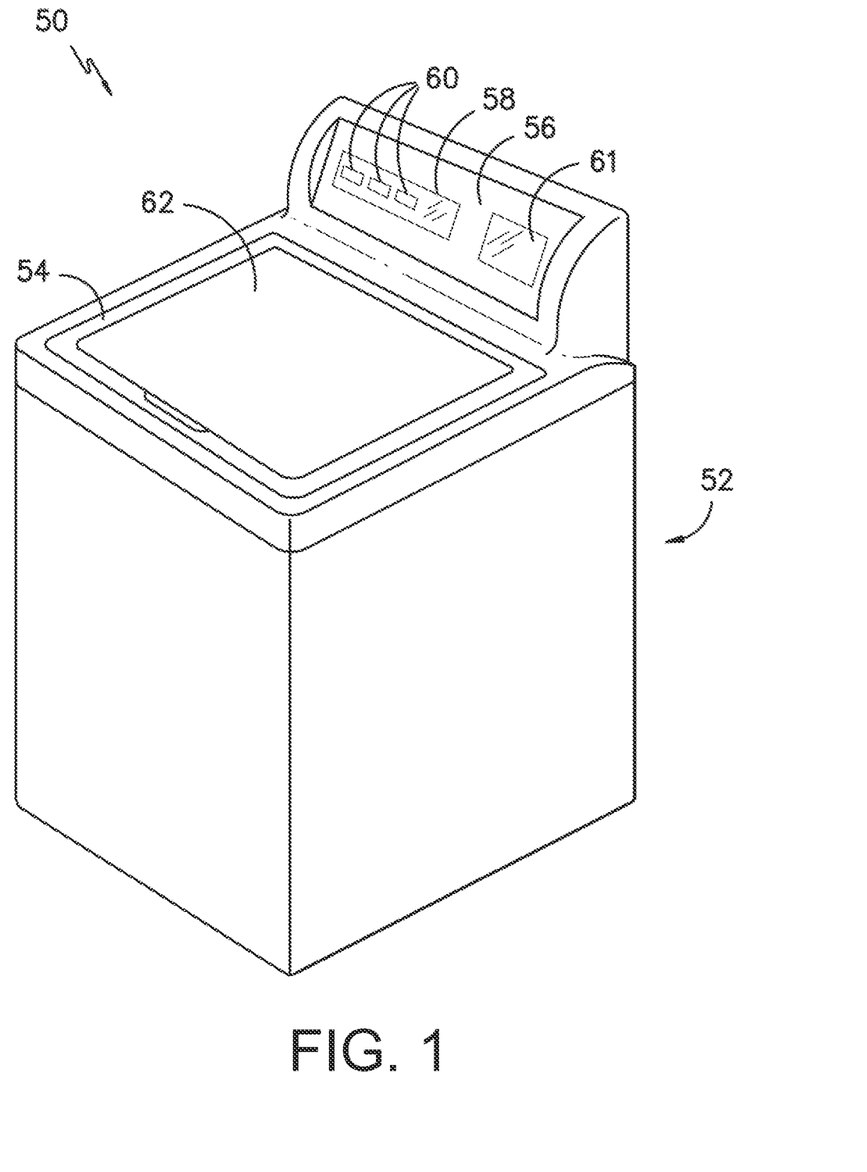
FIG. 1 provides a perspective view of a washing machine appliance according to an exemplary embodiment of the present subject matter.

FIG. 1 is a perspective view of a washing machine appliance 50 according to an exemplary embodiment of the present subject matter. As may be seen in FIG. 1, washing machine appliance 50 includes a cabinet 52 and a cover 54. A backsplash 56 extends from cover 54, and a control panel 58 including a plurality of input selectors 60 is coupled to backsplash 56. Control panel 58 and input selectors 60 collectively form a user interface input for operator selection of machine cycles and features, and in one embodiment, a display 48 indicates selected features, a countdown timer, and/or other items of interest to machine users. A lid 62 is mounted to cover 54 and is rotatable between an open position (not shown) facilitating access to a wash tub 64 (FIG. 2) located within cabinet 52 and a closed position (shown in FIG. 1) forming an enclosure over wash tub 64.

Figure 2:
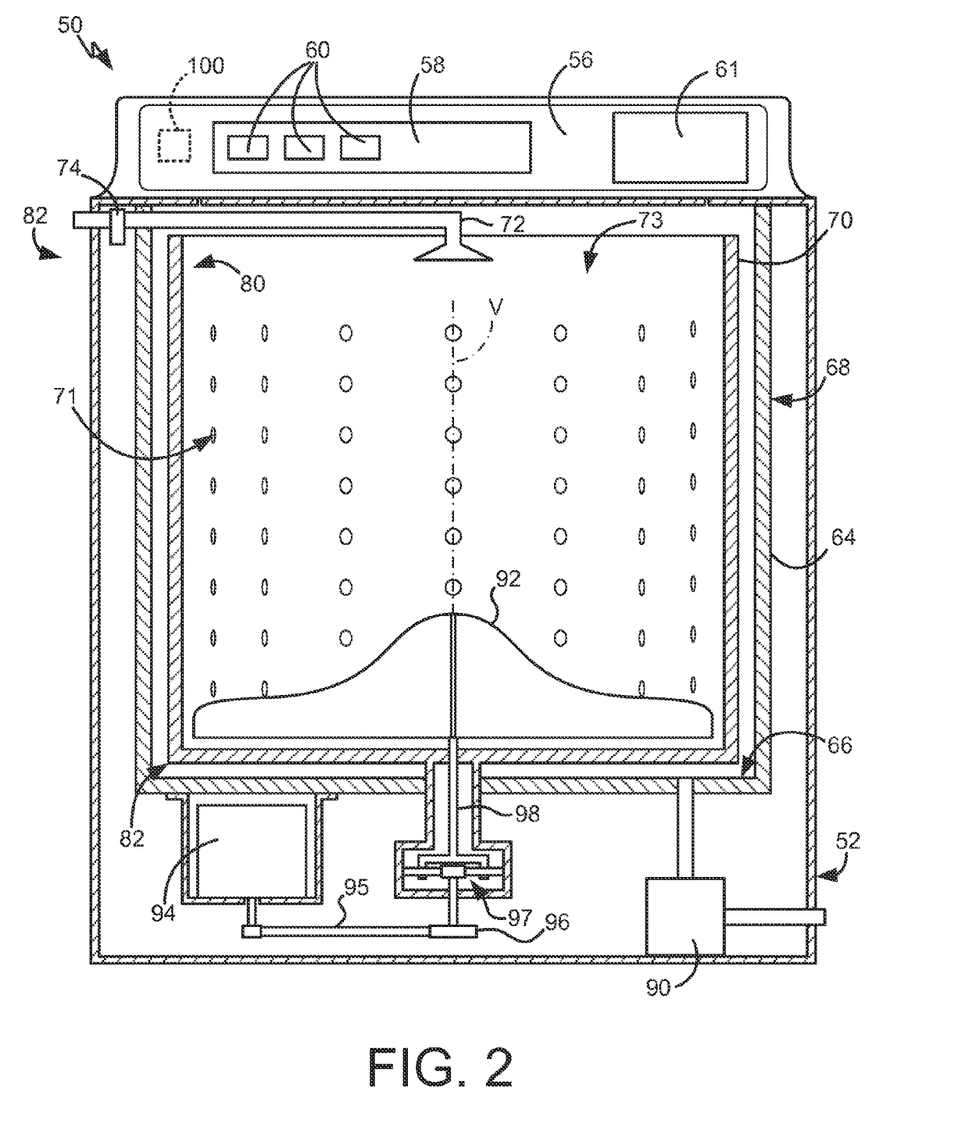
FIG. 2 provides a front, section view of the exemplary washing machine appliance of FIG. 1.

FIG. 2 provides a front, cross-section view of washing machine appliance 50. As may be seen in FIG. 2, wash tub 64 includes a bottom wall 66 and a sidewall 68. A wash basket 70 is rotatably mounted within wash tub 64. In particular, wash basket 70 is rotatable about a vertical axis V. Thus, washing machine appliance 50 is generally referred to as a vertical axis washing machine appliance. Wash basket 70 defines a wash chamber 73 for receipt of articles for washing and extends, e.g., vertically, between a bottom portion 80 and a top portion 82. Wash basket 70 includes a plurality of perforations 71 therein to facilitate fluid communication between an interior of wash basket 70 and wash tub 64.

A spout 72 is configured for directing a flow of fluid into wash tub 64. In particular, spout 72 may be portioned at or adjacent top portion 82 of wash basket 70. Spout 72 may be in fluid communication with a water supply (not shown) in order to direct fluid (e.g., clean water) into wash tub 64 and/or onto articles within wash chamber 73 of wash basket 70. A valve 74 regulates the flow of fluid through spout 72. For example, valve 74 can selectively adjust to a closed position in order to terminate or obstruct the flow of fluid through spout 72. A pump assembly 90 (shown schematically in FIG. 2) is located beneath tub 64 and wash basket 70 for gravity assisted flow to drain wash tub 64.

An agitation element 92, shown as an impeller in FIG. 2, is disposed in wash basket 70 to impart an oscillatory motion to articles and liquid in wash chamber 73 of wash basket 70. In various exemplary embodiments, agitation element 92 includes a single action element (i.e., oscillatory only), double action (base and auger move together when rotated in one direction, and only base turns and auger is stationary when rotated in opposite direction) or triple action (auger always turns in same direction, base alternates directions). As illustrated in FIG. 2, agitation element 92 is oriented to rotate about vertical axis V. Wash basket 70 and agitation element 92 are driven by a motor 94. As may be seen in FIG. 2, a belt 95 couples motor to a pulley 96. Pulley 96 is connected to a sun gear of a planetary transmission 97. Basket 70 is connected to a ring gear of planetary transmission 97, and agitation element 92 is connected to a planet gear carrier of planetary transmission 97. As an output shaft of motor 94 rotates belt 95 transfers rotation to pulley 96 which rotates the sun gear of planetary transmission 97.

Motor 94 may be rotated in two opposite directions. Thus, wash basket 70 and agitation element 92 are disposed for rotatable movement in two opposite directions within wash tub 64, e.g., about vertical axis V. Washing machine appliance 50 may also include a brake assembly (not shown) selectively applied or released for respectively maintaining wash basket 70 (or agitation element 92) in a stationary position within wash tub 64 or for allowing wash basket 70 (or agitation element 92) to spin within wash tub 64.

The agitation system of washing machine appliance 50 has one degree of freedom or two degrees of freedom depending upon whether wash basket 70 is locked or unlocked relative to wash tub 64 (or whether agitation element 92 is locked or unlocked relative to wash tub 64). When wash basket 70 is unlocked, agitation element 92 is directly coupled to motor 94 such that motor 94 rotates agitation element 92. However, wash basket 70 may also be loosely coupled to motor 94 (e.g., via friction at planetary transmission 97) such that motor 94 also rotates wash basket 70 when wash basket 70 is unlocked. Thus, the agitation system of washing machine appliance 50 has two degrees of freedom when wash basket 70 is unlocked relative to wash tub 64. Conversely, when wash basket 70 is locked, agitation element 92 is directly coupled to motor 94 such that motor 94 rotates agitation element 92. However, motor 94 does not rotate wash basket 70 when wash basket 70 is locked. Thus, the agitation system of washing machine appliance 50 has one degree of freedom when wash basket 70 is locked relative to wash tub 64.

Operation of washing machine appliance 50 is controlled by a processing device or controller 100, that is operatively coupled to the user interface input located on washing machine backsplash 56 (shown in FIG. 1) for user manipulation to select washing machine cycles and features. In response to user manipulation of the user interface input, controller 100 operates the various components of washing machine appliance 50 to execute selected machine cycles and features.

Controller 100 may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 100 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 58 and other components of washing machine appliance 50 may be in communication with controller 100 via one or more signal lines or shared communication busses.

In an illustrative embodiment, laundry items are loaded into wash chamber 73 of wash basket 70, and washing operation is initiated through operator manipulation of control input selectors 60. Wash tub 64 is filled with water and mixed with detergent to form a wash fluid. Valve 74 can be opened to initiate a flow of water into wash tub 64 via spout 72, and wash tub 64 can be filled to the appropriate level for the amount of articles being washed. Once wash tub 64 is properly filled with wash fluid, the contents of the wash basket 70 are agitated with agitation element 92 for cleaning of laundry items in wash basket 70. More specifically, agitation element 92 is moved back and forth in an oscillatory motion.

After the agitation phase of the wash cycle is completed, wash tub 64 is drained. Laundry articles can then be rinsed by again adding fluid to wash tub 64, depending on the particulars of the cleaning cycle selected by a user, agitation element 92 may again provide agitation within wash basket 70. One or more spin cycles may also be used. In particular, a spin cycle may be applied after the wash cycle and/or after the rinse cycle in order to wring wash fluid from the articles being washed. During a spin cycle, wash basket 70 is rotated at relatively high speeds.

While described in the context of a specific embodiment of washing machine appliance 50, using the teachings disclosed herein it will be understood that washing machine appliance 50 is provided by way of example only. Other washing machine appliances having different configurations (such as horizontal-axis washing machine appliances), different appearances, and/or different features may also be utilized with the present subject matter as well.

Figure 3:
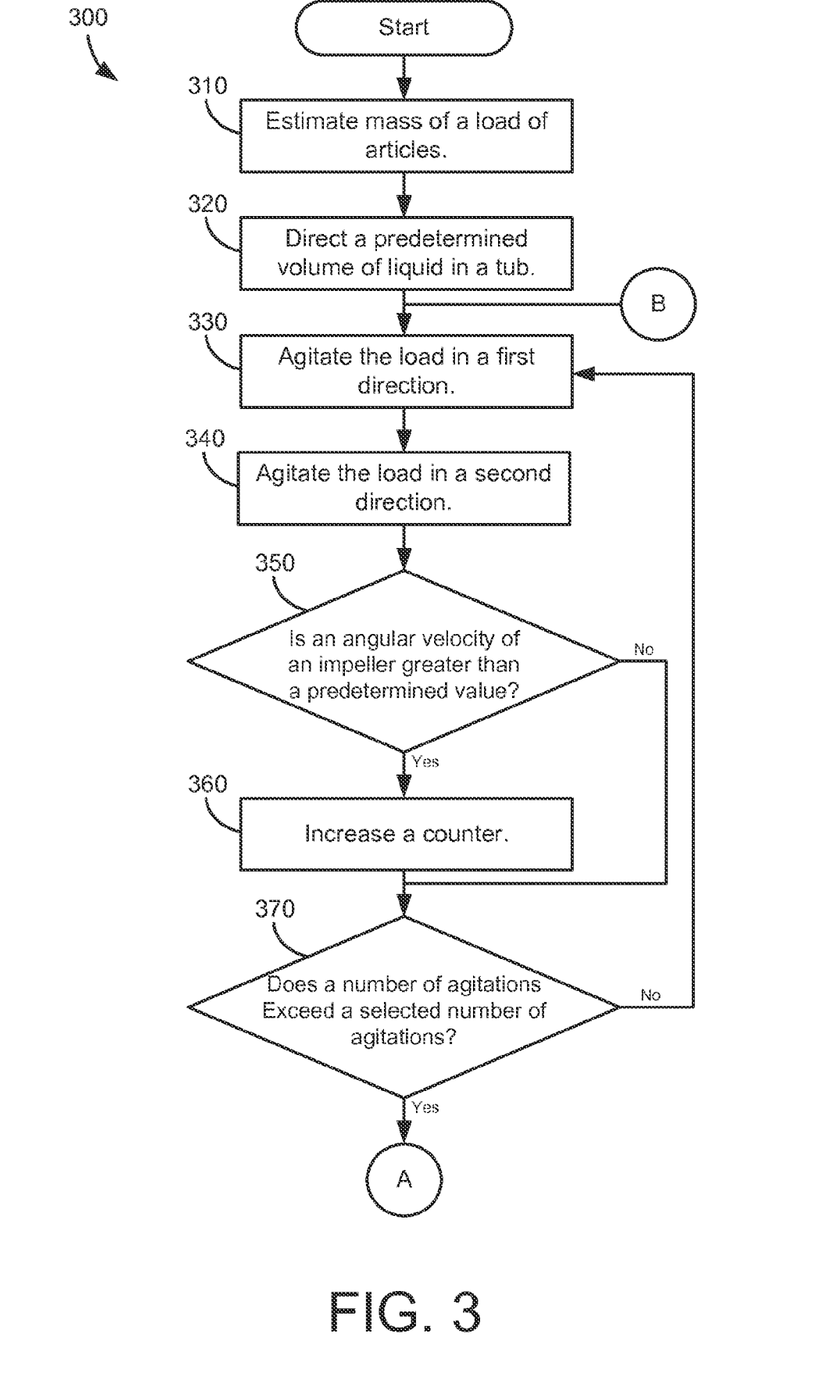
FIGS. 3 and 4 illustrate a method of operating a washing machine appliance according to an exemplary embodiment of the present subject matter.
Figure 4:
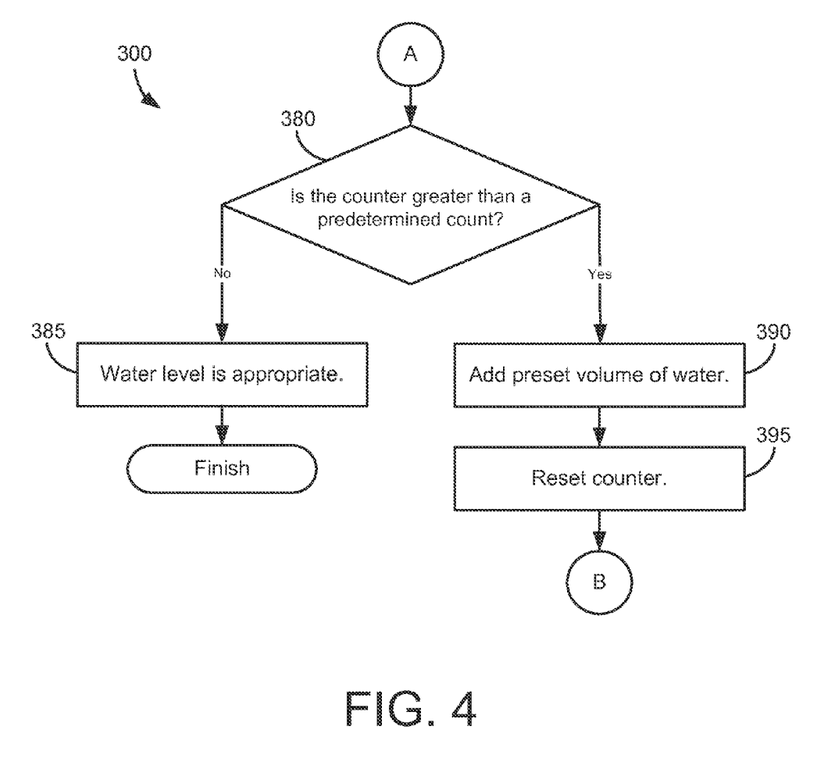

FIGS. 3 and 4 illustrate a method 300 of operating a washing machine appliance according to an exemplary embodiment of the present subject matter. Method 300 can be used to operate any suitable washing machine appliance, such as washing machine appliance 50 (FIG. 1). For example, method 300 may be programmed into and implemented by controller 100 (FIG. 2) of washing machine appliance 50. Thus, method 300 is described in greater detail below in the context of washing machine appliance 50. Utilizing method 300, controller 100 can assist with providing sufficient liquid within wash chamber 73 of wash basket 70 for proper operation of washing machine appliance 50.

At step 310, a mass of articles within wash basket 70 is estimated. As an example, method 300 may utilize the inertial method and/or the fill method described in U.S. Patent Publication No. 2015/0052688 of Obregon filed on Aug. 20, 2013, which is hereby incorporated by reference in its entirety for all purposes, to determine a mass of articles within wash basket 70 and a suitable volume of water to direct into wash basket 70. Thus, controller 100 may be programmed to implement the inertial method and/or the fill method described in U.S. Patent Publication No. 2015/0052688 of Obregon in order to estimate the mass of articles within wash basket 70.

With the inertial method, method 300 may include rotating wash basket 70 with motor 94. In particular, controller 100 may operate motor 94 such that wash basket 70 rotates at a predetermined frequency or angular velocity, e.g., about one hundred and twenty revolutions per minute. The angular velocity of wash basket 70 may then be adjusted. In particular, controller 100 can deactivate motor 94 in order to adjust the angular velocity of wash basket 70, e.g., by shorting windings of motor 94. Controller 100 may then determine an angular acceleration or first derivative of the angular velocity of wash basket 70 or a jerk or a second derivative of the angular velocity of wash basket 70, e.g., based at least in part the adjustment of the angular velocity of wash basket 70. Based upon the first and/or second derivative of the angular velocity of wash basket 70, controller 100 estimates a mass of articles within wash chamber 73 of wash basket 70 at step 310. Thus, controller 100 may establish the mass of articles within wash chamber 73 of wash basket 70 based upon the inertia of articles within wash chamber 73 of wash basket 70 at step 310. As an example, the magnitude of the first and/or second derivative of the angular velocity of wash basket 70 may be inversely proportional to the mass of articles within wash chamber 73 of wash basket 70. Thus, controller 100 can correlate the magnitude of the first and/or second derivative of the angular velocity of wash basket 70 to the mass of articles within wash chamber 73 of wash basket 70 at step 310.

With the fill method, method 800 may include providing a plurality of liquid volume-liquid level absorption correlations. For example, the plurality of liquid volume-liquid level absorption correlations can be established experimentally and may be stored in the memory of controller 100 during production of washing machine appliance 50. Each absorption correlation of the plurality of liquid volume-liquid level absorption correlations corresponds to a respective load size or mass of articles within wash chamber 73 of wash basket 70 for each measured height of liquid in tub 64. Thus, controller 100 can correlate the volume of liquid directed into wash basket 70 to the mass of articles within wash chamber 73 of wash basket 70 by directing a volume of liquid into the wash basket 70 and measuring a height of liquid in the wash basket 70.

At step 320, a predetermined volume of liquid is directed into wash tub 64. For example, controller 100 may open valve 74 in order to direct the predetermined volume of liquid into wash tub 64 at step 320. The predetermined volume of liquid may correspond to the mass of articles and/or a load type of articles within wash chamber 73 of wash basket 70. For example, controller 100 can direct a larger volume of water into wash tub 64 of washing machine appliance 50 at step 320 for loads that are larger than other, smaller loads, and controller 100 can direct a smaller volume of water into wash tub 64 of washing machine appliance 50 at step 320 for loads that are smaller than other, larger loads.

Steps 310 and 320 may correspond to an initial fill of a wash cycle of washing machine appliance 50. Thus, based at least in part on the mass of articles within washing machine appliance 50, wash tub 64 may be filled with a volume of water to generate a wash fluid within wash tub 64 for the wash cycle. Subsequent steps of method 300 may be performed in order to insure that wash tub 64 is not underfilled at step 320, as discussed in greater detail below.

At step 330, impeller 92 is rotated in a first direction with motor 94. For example, controller 100 may activate motor 94 at step 330 such that motor 94 rotates impeller 92 in the first direction. Wash basket 70 may be locked at step 330 such that wash basket 70 does not rotate with impeller 92 and/or is fixed relative to wash tub 64. Motor 94 may be operated at any suitable power output at step 330. For example, motor 94 may be operated at a full power output of motor 94 at step 330. As will be understood by those skilled in the art, the full power output of motor 94 may correspond to a maximum power output of motor 94 permitted by regulation and/or by safety features of washing machine appliance 50. As another example, the power output of motor 94 may be less than the full power output of motor 94 at step 330. In particular, the power output of motor 94 may be no greater than half the full power output of motor 94 at step 330.

At step 340, impeller 92 is rotated in a second direction with motor 94, the second direction being opposite the first direction. For example, controller 100 may activate motor 94 at step 340 such that motor 94 rotates impeller 92 in the second direction. Wash basket 70 may be locked at step 340 such that wash basket 70 does not rotate with impeller 92 and/or is fixed relative to wash tub 64. Motor 94 may be operated at any suitable power output at step 340. For example, motor 94 may be operated at a power output during step 340 that is less than the power output of motor 94 at step 330. In particular, the power output of motor 94 may be no greater than half the power output of motor 94 at step 330, e.g., no greater than half the full power output of motor 94, at step 340. As another example, the power output of motor 94 at steps 330 and 340 may be about equal. As used herein, the term "about" means within ten percent of the stated power when used in the context of powers.

Between steps 330 and 340, motor 94 may be deactivated and/or paused. As an example, controller 100 may briefly deactivate motor 94 between steps 330 and 340. Thus, step 340 need not be performed immediately after step 330.

As described above, impeller 92 may rotate in two different directions at steps 330 and 340 with a power of motor 94 being less at step 340 than at step 330. Such exemplary embodiments may be utilized when washing machine appliance 100 includes a planetary transmission and when basket 70 is not locked. In alternative exemplary embodiments, impeller 92 may rotate in two different directions at steps 330 and 340 with a power of motor 94 being less a full power of motor 94 at steps 330 and 340, e.g., when basket 70 is locked relative to wash tub 64. In other exemplary embodiments, impeller 92 may rotate in the same direction at steps 330 and 340 with a power of motor 94 being less a full power of motor 94 at steps 330 and 340, e.g., when basket 70 is locked relative to wash tub 64.

At step 350, a maximum angular velocity of impeller 92 is determined. In particular, the maximum angular velocity of impeller 92 is determined when impeller 92 is rotating in the second direction during step 340. Controller 100 may measure or otherwise determine the maximum angular velocity of impeller 92 at step 350 using any suitable method or mechanism. For example, speed sensors, such as Hall effect sensors and magnets, may be used to determine the angular velocity of impeller 92 at step 350.

If the maximum angular velocity of impeller 92 is greater than a predetermined value at step 350, a counter of controller 100 may be increased at step 360. Conversely, step 360 may be skipped if the maximum angular velocity of impeller 92 does not exceed the predetermined value at step 360. The predetermined value may be any suitable angular velocity. For example, the predetermined value may be no less than about one thousand rotations per minute (e.g., of motor 94) or no less than about eighty basket rotations per minute (e.g., of impeller 92). As another example, the predetermined value may be no less than about eight hundred rotations per minute (e.g., of motor 94) or no less than about seventy rotations per minute (e.g., of impeller 92). As used herein, the term "about" means within ten percent of the stated speed when used in the context of speeds.

Steps 330-350 may be repeated to perform a series of agitations. Thus, at step 370, a number of performed agitations (e.g., each repetition of steps 320-350) is compared to a selected number of agitations, N. If the number of performed agitations does not meet or exceed the selected number of agitations N then steps 330-350 are repeated. Conversely, if the number of performed agitations does meet or exceed the selected number of agitations N then method 300 continues to step 380. Thus, steps 330-350 may correspond to performing a series of agitations with impeller 92. Each agitation of the series of agitations includes rotating impeller 92 in the first direction with motor 94 and then rotating impeller 92 in the second direction with motor 94. The series of agitations may include any suitable number of agitations. For example, the series of agitations may include no less than five agitations.

At step 360, the counter is increased each time the maximum angular velocity of impeller 92 is less than the threshold angular velocity when impeller 92 is rotating in the second direction during the series of agitations. At step 380, the counter is compared to a predetermined count. Thus, controller 100 may determine a number of times that the maximum angular velocity of impeller 92 exceeded the threshold angular velocity when impeller rotated in the second direction during the series of agitations. If the counter does not exceed a minimum count, M, at step 380, then the liquid level within wash tub 64 is appropriate and the wash cycle continues, e.g., with the associated steps described above. The minimum count M may be any suitable portion of the series of agitations. As an example, the minimum count M may be no more than half the agitations of the series of agitations.

If the counter exceeds the minimum count M at step 380, liquid is added to wash tub 64. For example, controller 100 may open valve 74 in order to add the liquid into wash tub 64 at step 390. In particular, controller 100 may open valve 74 in order to add a preset volume of the liquid into wash tub 64 at step 390. The preset volume of liquid may be any suitable volume of liquid. For example, the preset volume of liquid may be about two gallons. As another example, the preset volume of liquid may be about three gallons. As used herein the term "about" means within ten percent of the stated volume when used in the context of volumes.

Method 300 may assist with ensuring that sufficient liquid is disposed within wash tub 64 during the wash cycle. When the maximum angular velocity of impeller 92 exceeds the threshold angular velocity, articles within wash basket 70 float over or flow on impeller 92 without significantly hindering rotation of impeller 92, e.g., relative to wash basket 70. However, when the maximum angular velocity of impeller 92 does not exceed the threshold angular velocity, articles within wash basket 70 may be resting on impeller 92 and/or hindering rotation of impeller 92, e.g., relative to wash basket 70. Thus, additional liquid may be needed within wash tub 64, e.g., such that articles within wash basket 70 float or flow within wash basket 70 over impeller 92. If the maximum angular velocity of impeller 92 when impeller 92 is rotating in the second direction during the series of agitations is less than the threshold angular velocity during a minimum count M of the series of agitations then method 300 adds additional liquid.

It should be understood that the present subject matter assists with detecting underfilling of a washing machine appliance by operating a motor at reduced power to turn an impeller and measuring a speed of the impeller while the motor is operating at reduced power. If the motor does not turn the impeller at above a threshold speed (e.g., rpm) when the motor is operating at reduced power then water is added to the washing machine. When the motor reaches the threshold speed at reduced power then the motor may (e.g., will) operate correctly at full power.

Figure 5:
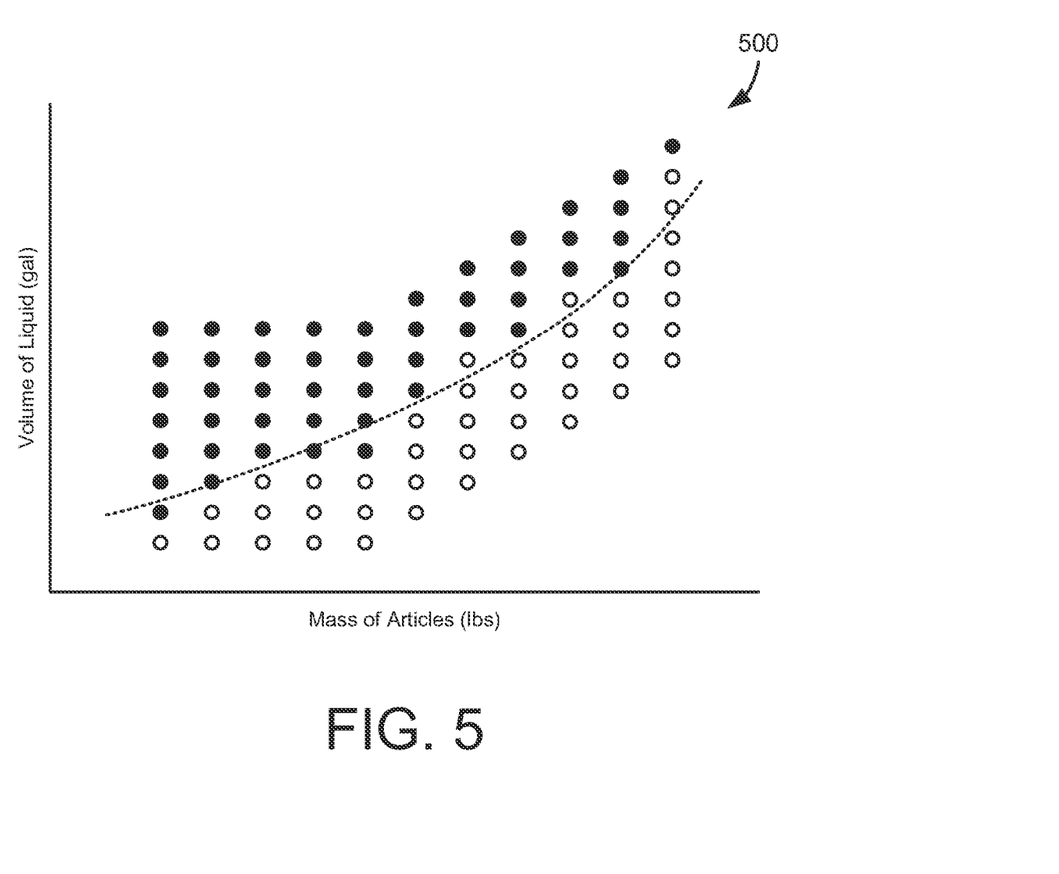
FIG. 5 illustrates an exemplary plot of a volume of liquid within a tub of a washing machine appliance versus a mass of articles within a basket of the washing machine appliance for the method of FIGS. 3 and 4.

FIG. 5 illustrates an exemplary plot 500 of a volume of liquid within wash tub 64 versus a mass of articles within wash basket 70 during method 300. The filled circles within plot 500 correspond when the counter does not exceed the minimum count M at step 380, and the unfilled circles correspond to when the counter exceeds the minimum count M at step 380. The dashed line corresponds to a minimum fill level for articles within wash basket 70 to wash properly during operation of washing machine appliance 50, and, as may be seen in FIG. 5, the minimum fill level for articles within wash basket 70 to wash properly during operation of washing machine appliance 50 increases with respect to the mass of articles within wash basket 70. A shape of a line between formed at a boundary between the filled and unfilled circles also generally corresponds to the shaped the dashed line. Thus, method 300 may assist with accurately adding additional liquid to wash tub 64 when needed across a variety of load masses.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for detecting underfilling of a washing machine appliance, comprising:
    adding a predetermined volume of liquid to a tub of the washing machine appliance;
    performing a series of agitations with an impeller of the washing machine appliance, each agitation of the series of agitations comprising rotating the impeller of the washing machine appliance in a first direction with a motor of the washing machine appliance and then rotating the impeller of the washing machine appliance in a second direction with the motor of the washing machine appliance, a power of the motor when the motor rotates the impeller in the second direction being less than a power of the motor when the motor rotates the impeller in the first direction during the series of agitations;
    determining a maximum angular velocity of the impeller when the impeller is rotating in the second direction during each agitation of the series of agitations; and
    adding liquid to the tub of the washing machine appliance if the maximum angular velocity of the impeller is less than a threshold angular velocity when the impeller is rotating in the second direction during the series of agitations,
    wherein the power of the motor when the motor rotates the impeller in the first direction is a predetermined first power output, and wherein the power of the motor when the motor rotates in the impeller in the second direction is predetermined second power output that is less than the first power output.

2. The method of claim 1, wherein each agitation of the series of agitations comprises rotating the impeller of the washing machine appliance in a first direction with a motor of the washing machine appliance then deactivating the motor of the washing machine for a period of time and then rotating the impeller of the washing machine appliance in a second direction with the motor of the washing machine appliance.

3. The method of claim 1, wherein the series of agitations comprises no less than five agitations.

4. The method of claim 3, further comprising increasing a counter of the washing machine appliance each time the maximum angular velocity of the impeller is less than the threshold angular velocity when the impeller is rotating in the second direction during the series of agitations.

5. The method of claim 4, said step of adding liquid to the tub of the washing machine appliance comprises adding liquid to the tub of the washing machine appliance if the counter of the washing machine appliance exceeds a minimum count, M.

6. The method of claim 5, wherein the minimum count M is no less than half of a number of agitations of the series of agitations.

7. The method of claim 1, wherein said step of adding liquid to the tub of the washing machine appliance comprises adding a preset volume of liquid to the tub of the washing machine appliance.

8. The method of claim 1, wherein the power of the motor is a full power of the motor when the motor rotates the impeller in the first direction during the series of agitations.

9. The method of claim 8, wherein the power of the motor is no greater than half the full power of the motor when the motor rotates the impeller in the second direction during the series of agitations.

10. The method of claim 1, wherein the power of the motor is no greater than half a full power of the motor when the motor rotates the impeller in the second direction during the series of agitations.

11. A method for detecting underfilling of a washing machine appliance, comprising:
    adding a predetermined volume of liquid to a tub of the washing machine appliance;
    rotating an impeller of the washing machine appliance in a first direction with a motor of the washing machine appliance;
    rotating the impeller of the washing machine appliance in a second direction with the motor of the washing machine appliance, a power of the motor at said step of rotating the impeller of the washing machine appliance in the second direction being less than a power of the motor at said step of rotating the impeller of the washing machine appliance in the first direction;
    determining a maximum angular velocity of the impeller during said step of rotating the impeller of the washing machine appliance in the second direction; and
    adding liquid to the tub of the washing machine appliance if the maximum angular velocity of the impeller during said step of rotating the impeller of the washing machine appliance in the second direction is less than a threshold angular velocity,
wherein the power of the motor at said step of rotating the impeller of the washing machine appliance in the first direction is a predetermined first power output, and wherein the power of the motor at said step of rotating the impeller of the washing appliance in the second direction is a predetermined second power output that is less than the first power output.

12. The method of claim 11, further comprising deactivating the motor of the washing machine appliance between said step of rotating the impeller of the washing machine appliance in the first direction and said step of rotating the impeller of the washing machine appliance in the second direction.

13. The method of claim 11, further comprising repeating said step of rotating the impeller of the washing machine appliance in the first direction and said step of rotating the impeller of the washing machine appliance in the second direction a number of times, N, the number of times N being no less than five.

14. The method of claim 13, wherein said step of determining the maximum angular velocity of the impeller comprises determining the maximum angular velocity of the impeller during each step of rotating the impeller of the washing machine appliance in the second direction.

15. The method of claim 14, further comprising increasing a counter of the washing machine appliance when the maximum angular velocity of the impeller is less than the threshold angular velocity during each step of rotating the impeller of the washing machine appliance in the second direction.

16. The method of claim 15, said step of adding liquid to the tub of the washing machine appliance comprises adding liquid to the tub of the washing machine appliance if the counter of the washing machine appliance exceeds a minimum count, M.

17. The method of claim 16, wherein the minimum count M is no less than half the number of times N.

18. The method of claim 11, wherein said step of adding comprises adding liquid to a tub of the washing machine appliance comprises adding a preset volume of liquid to the tub of the washing machine appliance.

19. A method for detecting underfilling of a washing machine appliance, comprising:
adding a predetermined volume of liquid to a tub of the washing machine appliance; rotating an impeller of the washing machine appliance in a first direction with a motor of the washing machine appliance;
rotating the impeller of the washing machine appliance in a second direction with the motor of the washing machine appliance, a power of the motor at said step of rotating the impeller of the washing machine appliance in the second direction being less than a power of the motor at said step of rotating the impeller of the washing machine appliance in the first direction, wherein the power of the motor at said step of rotating the impeller of the washing machine appliance in the first direction is a predetermined first power output, and wherein the power of the motor at said step of rotating the impeller of the washing machine appliance in the second direction is a predetermined second power output that is less than the first power output;
determining a maximum angular velocity of the impeller during said step of rotating the impeller of the washing machine appliance in the second direction;
adding a preset volume of liquid to the tub of the washing machine appliance if the maximum angular velocity of the impeller during said step of rotating the impeller of the washing machine appliance in the second direction is less than a threshold angular velocity; and
repeating said step of rotating the impeller of the washing machine appliance in the first direction and said step of rotating the impeller of the washing machine appliance in the second direction a number of times, N.

20. The method of claim 19, further comprising:
increasing a counter of the washing machine appliance when a maximum angular velocity of the impeller is less than the threshold angular velocity during each step of rotating the impeller of the washing machine appliance in the second direction; and
adding a preset volume of liquid to the tube of the washing machine appliance if the counter of the washing machine appliance exceeds a minimum count, M.

* * * * *

UNITED STATES PATENT AND TRADEMARK OFFICE
CERTIFICATE OF CORRECTION

PATENT NO. : 9,816,222 B2  
APPLICATION NO. : 14/868470  
DATED : November 14, 2017  
INVENTOR(S) : Roberto Obregon It is certified that error appears in the above-identified patent and that said Letters Patent is hereby corrected as shown below:

In the Claims

In Column 10, Line 8, Claim 1: "is predetermined" should read "is a predetermined";

In Column 11, Line 7, Claim 12: "washing appliance" should read "washing machine appliance";

In Column 11, Line 40 & 41, Claim 20: "step of adding comprises adding liquid" should read "step of adding liquid";

In Column 11, Line 41, Claim 20: "to a tub" should read "to the tub".

Signed and Sealed this  
Tenth Day of July, 2018

Andrei Iancu  
*Director of the United States Patent and Trademark Office*